United States Patent [19]

Schmidt et al.

[11] Patent Number: 4,544,197
[45] Date of Patent: Oct. 1, 1985

[54] WINDSHIELD FOR MOTOR VEHICLES EQUIPPED WITH A WINDSHIELD WIPER INSTALLATION

[75] Inventors: Manfred Schmidt, Sindelfingen; Hans Trube, Herrenberg; Martin Pfeiffer, Stuttgart, all of Fed. Rep. of Germany

[73] Assignee: Daimler-Benz Aktiengesellschaft, Stuttgart, Fed. Rep. of Germany

[21] Appl. No.: 601,005

[22] Filed: Apr. 16, 1984

[30] Foreign Application Priority Data

Apr. 15, 1983 [DE] Fed. Rep. of Germany ....... 3313659

[51] Int. Cl.$^4$ .............................................. B60J 1/02
[52] U.S. Cl. ................................. 296/84 R; 15/250 R
[58] Field of Search ...................... 296/84 R, 95 R; 15/250 R, 250.05

[56] References Cited

U.S. PATENT DOCUMENTS

| 2,947,020 | 8/1960 | Wilfert et al. | 15/250.5 |
| 4,004,126 | 1/1977 | Boaz | 296/84 R |
| 4,378,484 | 3/1983 | Kunert | 296/84 R |

FOREIGN PATENT DOCUMENTS

| 25545 | 9/1980 | European Pat. Off. . | |
| 1235164 | 2/1967 | Fed. Rep. of Germany . | |
| 708891 | 8/1966 | Italy | 15/250 R |
| 1512327 | 6/1978 | United Kingdom | 15/250 R |

*Primary Examiner*—Robert R. Song
*Attorney, Agent, or Firm*—Craig & Burns

[57] ABSTRACT

A windshield for motor vehicles equipped with a windshield wiper system, which, for the improvement of the wiped field, includes in its lower area strip-shaped profile members whose side facing the bottom edge of the windshield form together with the windshield surface a water-collecting channel open in the downward direction. In order to prevent the rising of water from non-wiped areas in the lower part of the windshield onto wiped higher areas, provision is made according to the invention that the upper edge area of each profile member extends along the lower edge area of the associated wiper field.

11 Claims, 4 Drawing Figures

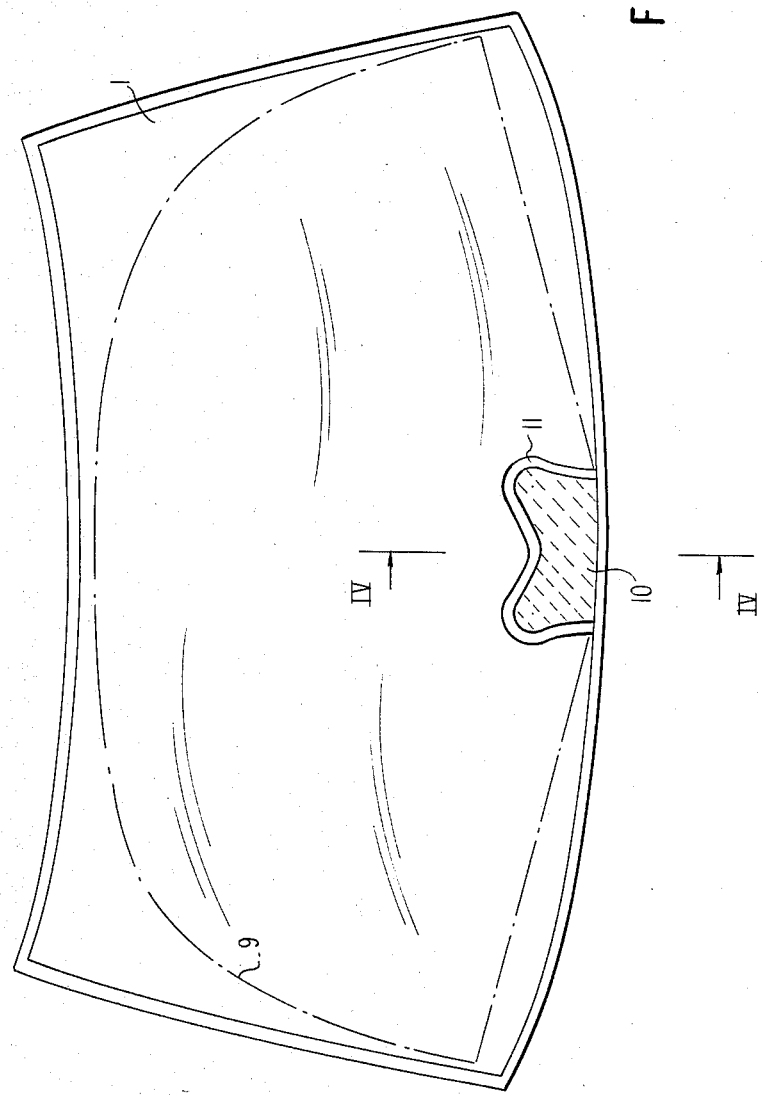

WINDSHIELD FOR MOTOR VEHICLES EQUIPPED WITH A WINDSHIELD WIPER INSTALLATION

The present invention relates to a windshield for motor vehicles equipped with a windshield wiper system, which includes in its lower area strip-shaped profile members for improving the wiper field, whose side facing the bottom edge of the windshield forms together with the windshield surface a water-collecting channel open in the downward direction.

Such a windshield is disclosed already in the European Patent application No. 0 025 545. In this prior art windshield, the profile members are arranged above the rest position of the wiper arms and serve as wipers for the windshield wiper blades.

In contradistinction thereto, the present invention is concerned with a different problem. More particularly, in all wiper windshield installations non-wiped areas remain in the lower part of the windshield which may be of relatively large area, especially with single-armed windshield wiper systems. The water which remains in these non-wiped areas, however, is forced upwardly during fast drives by the onflowing air and thereby adversely affects the wiped areas.

Accordingly, it is the object of the present invention to obviate these shortcomings and to so further develop a windshield of the aforementioned type that water which remains in non-wiped lower areas of the windshield cannot impair the through-vision of the vehicle passengers through the wiped areas.

The underlying problems are solved according to the present invention in that the upper edge area of each profile member extends along the lower edge area of the coordinated wiped field.

These and other objects, features and advantages of the present invention will become more apparent from the following description when taken in connection with the accompanying drawing which shows, for purposes of illustration only, two embodiments in accordance with the present invention, and wherein:

FIG. 3 is a front elevational view of a modified embodiment of a windshield equipped also with a single-arm windshield wiper installation in accordance with the present invention, whereby the single arm windshield wiper, however, is variable in its effective length; and FIG. 4 is a cross-sectional view taken along line IV—IV in FIG. 3.

Figure 1:
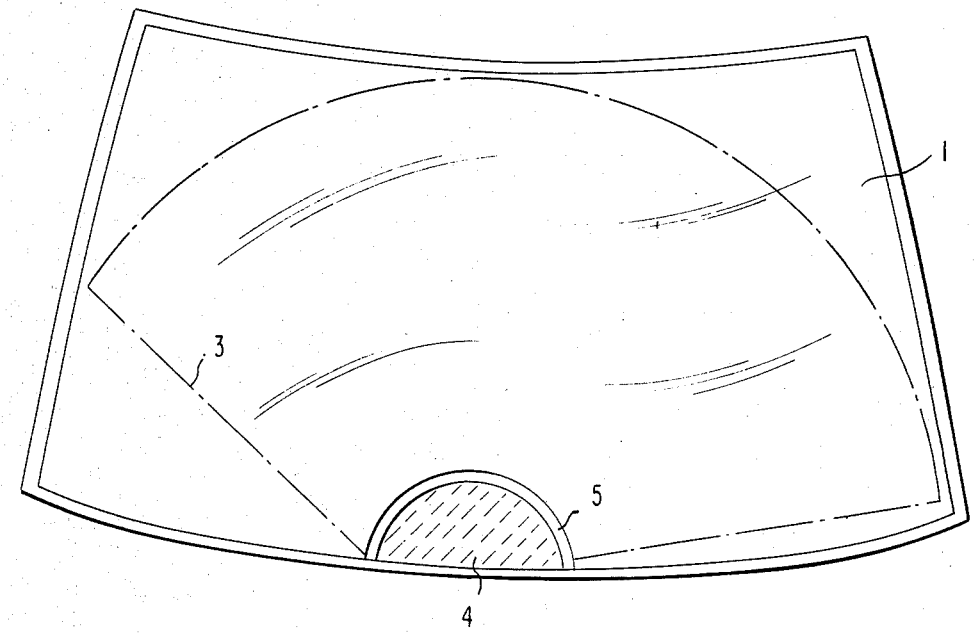
FIG. 1 is a front elevational view of a windshield of a motor vehicle equipped with a single-arm windshield wiper in accordance with the present invention.
Figure 2:
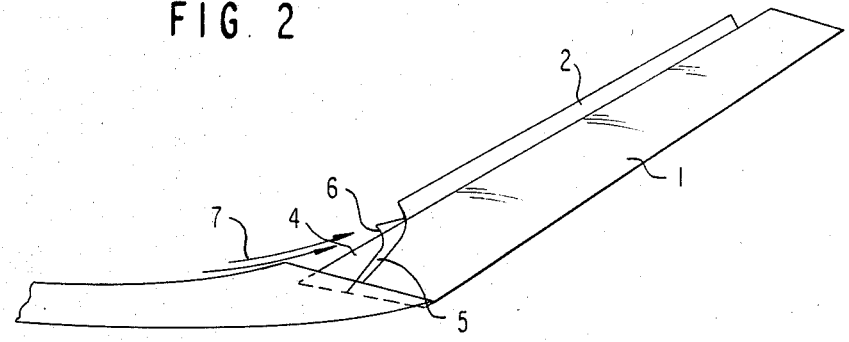
FIG. 2 is a partial side elevational view of the windshield of FIG. 1.

Referring now to the drawing wherein like reference numerals are used throughout the various views to designate like parts, a single-arm windshield wiper 2 serves for cleaning the windshield 1 illustrated in FIGS. 1 and 2 of a motor vehicle, which wipes a wiper field whose limits are indicated in FIG. 1 in dash and dotted lines. A non-wiped sector 4 remains in the center of the windshield 1 in the lower part thereof, which in FIG. 1 is indicated by cross-hatching. In order to reliably prevent a rising of the water remaining thereat under the influence of the air flow indicated in FIG. 2 by arrows 7, a profile member 5 is provided whose upper edge area extends along the lower edge area of the wiped field and whose side facing the lower edge of the windshield 1 forms together with the windshield surface a water-collecting channel 6 open in the downward direction. The profile member 5 thereby consists, for example, of plexiglass in order to impair as little as possible the through-vision through the windshield 1.

The shape of the profile member 5 will be described more fully hereinafter in conjunction with the embodiment of the present invention illustrated in FIGS. 3 and 4 of the drawing.

The windshield 1 illustrated in these figures is also cleaned by a single-arm windshield wiper 8 which is variable in its effective length in a conventional manner in order to leave a non-wiped area which is only as small as possible within the upper area of the windshield 1. The boundaries of the wiped field are designated in FIG. 3 by reference numeral 9. The non-wiped area 10 remaining in the lower area of the windshield 1 receives a shape differing from the circular shape due to the change in length of the single-arm windshield wiper 8, also referred to as control; however, the profile member 11 is accurately adapted in its configuration to this differing shape.

As can be seen from FIG. 4, the profile member 11 has a saw-tooth-like cross section. It is important in connection therewith that the side of the profile member 11 facing the bottom edge of the windshield subtends with the windshield surface an angle of no more than 90° in order to assure a completely satisfactory retention of the water. However, it would also be feasible within the scope of the present invention to construct this side, for example, as a groove or channel open in the downward direction.

While we have shown and described only two embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A windshield for motor vehicles equipped with a windshield wiper means, which includes in its lower area strip-shaped profile means for improving the wiped field, the side of the profile means facing the bottom edge of the windshield forming together with the windshield surface a water-collecting groove open in the downward direction, and the upper edge area of said profile means extending substantially along the lower edge area of the coordinated wiped field.

2. A windshield according to claim 1, wherein the windshield wiper system includes a single-arm windshield wiper leaving a non-wiped area in the lower part of the windshield, the profile means extending along the boundary between the wiped area and the non-wiped area below the windshield wiper.

3. A windshield according to claim 2, wherein said non-wiped area is located centrally in the lower area of the windshield.

4. A windshield according to claim 3, wherein said non-wiped area forms an at least approximately part-circular area.

5. A windshield according to claim 3, with a single-arm wiper of variable effective length, wherein said non-wiped area is of at least approximately rectangular configuration with its two upwardly facing corner regions rounded-off.

6. A windshield according to claim 1, wherein the profile means has a saw-tooth-like cross section.

7. A windshield according to claim 6, wherein the side of the profile means facing the bottom edge of the windshield subtends an angle of no more than 90° with the windshield surface.

8. A windshield according to claim 7, wherein the windshield wiper system includes a single-arm windshield wiper leaving a non-wiped area in the lower part of the windshield, the profile means extending along the boundary between the wiped area and the non-wiped area below the windshield wiper.

9. A windshield according to claim 7, wherein said non-wiped area is located centrally in the lower area of the windshield.

10. A windshield according to claim 9, wherein said non-wiped area forms an at least approximately part-circular area.

11. A windshield according to claim 9, with a single-arm wiper of variable effective length, wherein said non-wiped area is of at least approximately rectangular configuration with its two upwardly facing corner regions rounded-off.

* * * * *